United States Patent
Nakashima et al.

(10) Patent No.: US 12,128,815 B2
(45) Date of Patent: Oct. 29, 2024

(54) HEADLIGHT CONTROLLER, HEADLIGHT CONTROL METHOD, AND HEADLIGHT SYSTEM HAVING A RAINFALL AMOUNT DETECTION MEANS

(71) Applicant: Stanley Electric Co., Ltd., Tokyo (JP)

(72) Inventors: Wataru Nakashima, Tokyo (JP); Yasushi Kita, Tokyo (JP); Takako Kimura, Tokyo (JP); Shuto Oyama, Tokyo (JP); Kouki Kudo, Tokyo (JP); Akihisa Kumakura, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/271,857

(22) PCT Filed: Dec. 13, 2021

(86) PCT No.: PCT/JP2021/045762
§ 371 (c)(1),
(2) Date: Jul. 12, 2023

(87) PCT Pub. No.: WO2022/153754
PCT Pub. Date: Jul. 21, 2022

(65) Prior Publication Data
US 2024/0116429 A1    Apr. 11, 2024

(30) Foreign Application Priority Data
Jan. 15, 2021    (JP) .................................. 2021-004746

(51) Int. Cl.
*B60Q 1/14*    (2006.01)
*B60Q 1/00*    (2006.01)
*B60Q 1/08*    (2006.01)

(52) U.S. Cl.
CPC ........... *B60Q 1/143* (2013.01); *B60Q 1/0023* (2013.01); *B60Q 1/085* (2013.01); *B60Q 2300/312* (2013.01); *B60Q 2300/45* (2013.01)

(58) Field of Classification Search
CPC ...... B60Q 1/085; B60Q 1/1423; B60Q 1/143; B60Q 2300/312; B60Q 2300/31
See application file for complete search history.

(56) References Cited

FOREIGN PATENT DOCUMENTS

| JP | H07-47878 A | 2/1995 |
|----|-------------|--------|
| JP | 2007-099222 A | 4/2007 |

(Continued)

OTHER PUBLICATIONS

Translation of description for reference Fukushima JP2020032803 (2020).*

(Continued)

*Primary Examiner* — Robert J May
(74) *Attorney, Agent, or Firm* — XSENSUS LLP

(57) ABSTRACT

To improve pedestrian visibility. Provided is a headlight controller connectable to a first headlight and a second headlight spaced apart in a vehicle width direction at the front of the vehicle, the headlight controller including: a rainfall amount detection means installed in the vehicle; and a controller installed in the vehicle, where the controller is connected to the rainfall amount detection means, and the controller carries out control such that when rainfall amount detected by the rainfall amount detection means is equal to or more than a predetermined value, irradiation light from the first headlight becomes relatively darker than irradiation light from the second headlight.

8 Claims, 8 Drawing Sheets

(56) References Cited

FOREIGN PATENT DOCUMENTS

| | | |
|---|---|---|
| JP | 2014-024399 A | 2/2014 |
| JP | 2018-034758 A | 3/2018 |
| JP | 2020-032803 A | 3/2020 |

OTHER PUBLICATIONS

Translation of description for Kunisha JP 2018-034758A (2018).*
International Search Report and Written Opinion mailed on Feb. 1, 2022, received for PCT Application PCT/JP2021/045762, filed on Dec. 13, 2021, 10 pages including English Translation.

* cited by examiner

HEADLIGHT CONTROLLER, HEADLIGHT CONTROL METHOD, AND HEADLIGHT SYSTEM HAVING A RAINFALL AMOUNT DETECTION MEANS

CROSS-REFERENCE TO RELATED APPLICATIONS

The present application is based on PCT filing PCT/JP2021/045762, filed Dec. 13, 2021, which claims priority to JP 2021-004746, filed Jan. 15, 2021, the entire contents of each are incorporated herein by reference.

TECHNICAL FIELD

The present disclosure relates to a headlight controller, a headlight control method, and a headlight system.

BACKGROUND ART

Japanese Patent No. 6032248 (Patent Document 1) discloses a vehicle lighting device where, when a weather condition that causes poor visibility in front of a vehicle is detected, the vehicle lighting device controls its headlights to emit dimmed light toward a road surface portion in front of the vehicle that corresponds to a road shape estimated by a travel path estimation unit. Further, the vehicle lighting device is controlled so as not to emit light toward high altitude during rainfall or snowfall. However, it is considered that there is room for further improvement from the viewpoint of improving visibility of pedestrians present on a sidewalk along the side of the road, etc.

PRIOR ART DOCUMENT

Patent Document

Patent Document 1: Japanese Patent No. 6032248

SUMMARY OF THE INVENTION

Technical Problem

In a specific aspect, it is an object of the present disclosure to improve pedestrian visibility.

Solution to the Problem (1) A controller according to one aspect of the present disclosure is (a) a headlight controller connectable to a first headlight and a second headlight spaced apart in a vehicle width direction at the front of the vehicle, the headlight controller including: (b) a rainfall amount detection means installed in the vehicle; and (c) a controller installed in the vehicle, where the controller is connected to the rainfall amount detection means, and the controller carries out control such that when rainfall amount detected by the rainfall amount detection means is equal to or more than a predetermined value, irradiation light from the first headlight becomes relatively darker than irradiation light from the second headlight.

(2) A control method according to one aspect of the present disclosure is (a) a headlight control method for controlling lighting state of a first headlight and a second headlight by a controller, the first headlight and the second headlight spaced apart in a vehicle width direction at the front of the vehicle, (b) where, when rainfall amount detected by a rainfall amount detection means is equal to or more than a predetermined value, the controller carries out control such that irradiation light from the first headlight becomes relatively darker than irradiation light from the second headlight.

(3) A headlight system according to one aspect of the present disclosure is a headlight system including the controller of the above described (1), and a first headlight and a second headlight spaced apart in a vehicle width direction at the front of the vehicle.

According to the above configurations, pedestrian visibility can be improved.

MODE FOR CARRYING OUT THE INVENTION

Figure 1:
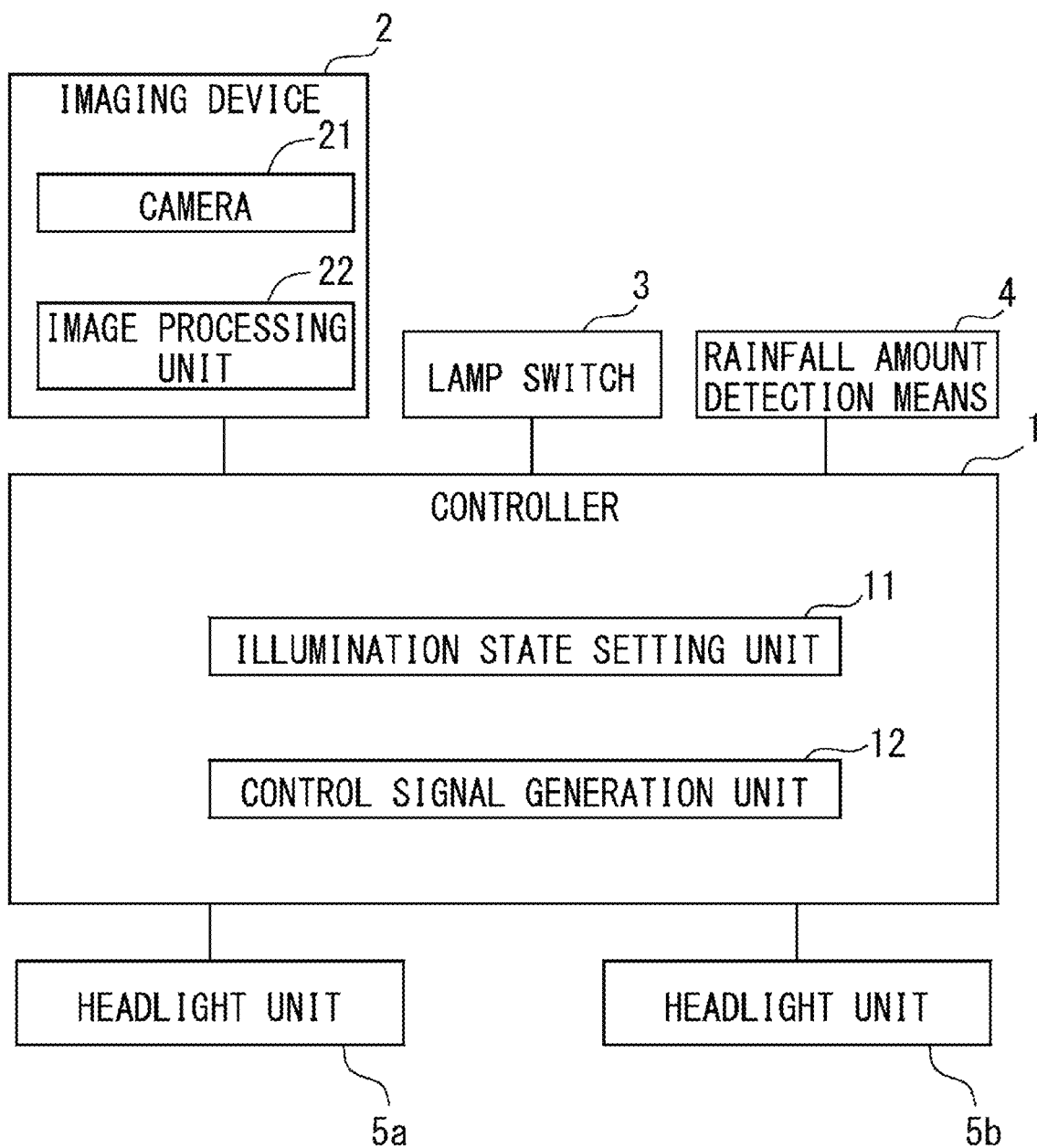
FIG. 1 is a diagram showing the configuration of a headlight system according to one embodiment.

FIG. 1 is a diagram showing the configuration of a headlight system according to one embodiment. The illustrated headlight system is configured to include a controller 1, an imaging device 2, a lamp switch 3, a rainfall amount detection means 4, and a pair of headlight units 5a and 5b. The headlight system is mounted to the front part of a vehicle to illuminate the front of the vehicle. In this specification, a headlight controller is configured to include the controller 1, the imaging device 2, and the rainfall amount detection means 4. Further, in this specification, the imaging device 2 corresponds to a pedestrian detector, the headlight unit 5a corresponds to a first headlight, and the headlight unit 5b corresponds to a second headlight.

The controller 1 controls light illumination of each of the headlight units 5a and 5b. The controller 1 can be configured using a computer system equipped with, for example, a processor (CPU: Central Processing Unit), a ROM (Read Only Memory), a RAM (Random Access Memory), a storage device such as a flash memory, and an input/output interface, etc. The controller 1 of the present embodiment is ready to perform its predetermined function by reading and executing a program stored in advance in a storage device (or ROM), by a processor. The controller 1 includes an illumination state setting unit 11 and a control signal generation unit 12 as functional blocks realized by executing the program.

The illumination state setting unit 11 sets the state of illumination light of each of the headlight units 5a and 5b based on the situation in front of the own vehicle photographed by the imaging device 2, the operation state of the lamp switch 3, and the rainfall amount detected by the rainfall amount detection means 4.

The control signal generation unit 12 generates a control signal for causing each of the headlight units 5a and 5b to form illumination light (irradiation light) corresponding to the state of the illumination light set by the illumination state setting unit 11, and supplies the control signal to each headlight unit 5a, 5b.

The imaging device 2 detects status of the position of a pedestrian, etc. based on images obtained by capturing the space in front of the own vehicle, and includes a camera 21 and an image processing unit 22. The camera 21 captures the space in front of the own vehicle and generates image data. The image processing unit 22 performs image recognition processing on the image data generated by the camera 21 to detect the status in front of the own vehicle, such as a position of a pedestrian, a position of a forward vehicle (a preceding vehicle or an oncoming vehicle), a white line on the road, etc.

Here, the function of the image processing unit 22 may be provided within the controller 1. In this case, image data is provided from the imaging device 2 to the controller 1, and image recognition processing is performed by executing a predetermined program within the controller 1.

The lamp switch 3 is installed near the driver's seat of the own vehicle at a position where it can be operated by a driver. The lamp switch 3 is operated by the driver when the driver prefers to illuminate the headlight units 5a and 5b.

The rainfall amount detection means 4 detects the amount of rainfall at where the own vehicle is located, and outputs a signal (or data) that indicates changes in accordance with the amount of rainfall. As the rainfall amount detection means 4, various known means can be used. As an example, as described in Japanese Unexamined Patent Application Publication No. 2006-29807, it is possible to use a sensor provided at the inside of a windshield of a vehicle to detect raindrops that adhere to the outer surface of the windshield, by an optical method. Further, as another example, the rainfall amount detection means 4 may be configured to obtain information from a wiper controller of its operating status, where the wiper controller controls driving of the wipers of the vehicle based on the output of the above described sensor.

The pair of headlight units 5a and 5b are mounted at predetermined positions on the left and right sides of the front portion of the own vehicle, and operate in accordance with a control signal provided by the controller 1 to form lights emitted forward of the vehicle. The headlight units 5a and 5b of the present embodiment are capable of forming low beam light (passing light) and high beam light (running light) respectively, and further, are capable of activating adaptive driving beam (ADB) which partially reduces (or turns off) light in a range set according to the position of a forward vehicle.

For each of the headlight units 5a and 5b, various publicly known configurations can be adopted. For example, a high beam or a low beam can be realized by a lamp unit having a configuration in which a light source bulb, a reflecting mirror, and a shielding plate are combined. Also, an adaptive driving beam can be realized by using a lamp unit in which light-emitting elements such as LEDs (Light Emitting Diodes) are arranged in one or two directions, and the lighting state of each light-emitting element is individually controlled. Further, an adaptive driving beam can be realized by using a lamp unit in which a light source, a liquid crystal element, and the like, are arranged, and in which light transmission state of each pixel of the liquid crystal element is individually controlled. Further, an adaptive driving beam can be realized by using a lamp unit in which a light emitting element such as a laser diode and a scanning element such as a mirror device that scans light emitted from the light emitting element are arranged, and in which the timing of turning on and off the light emitting element and the scan timing of the scanning element is controlled. Furthermore, in a lamp unit having one of the above configurations, a high beam and a low beam may be formed in addition to the adaptive driving beam.

Figure 2:
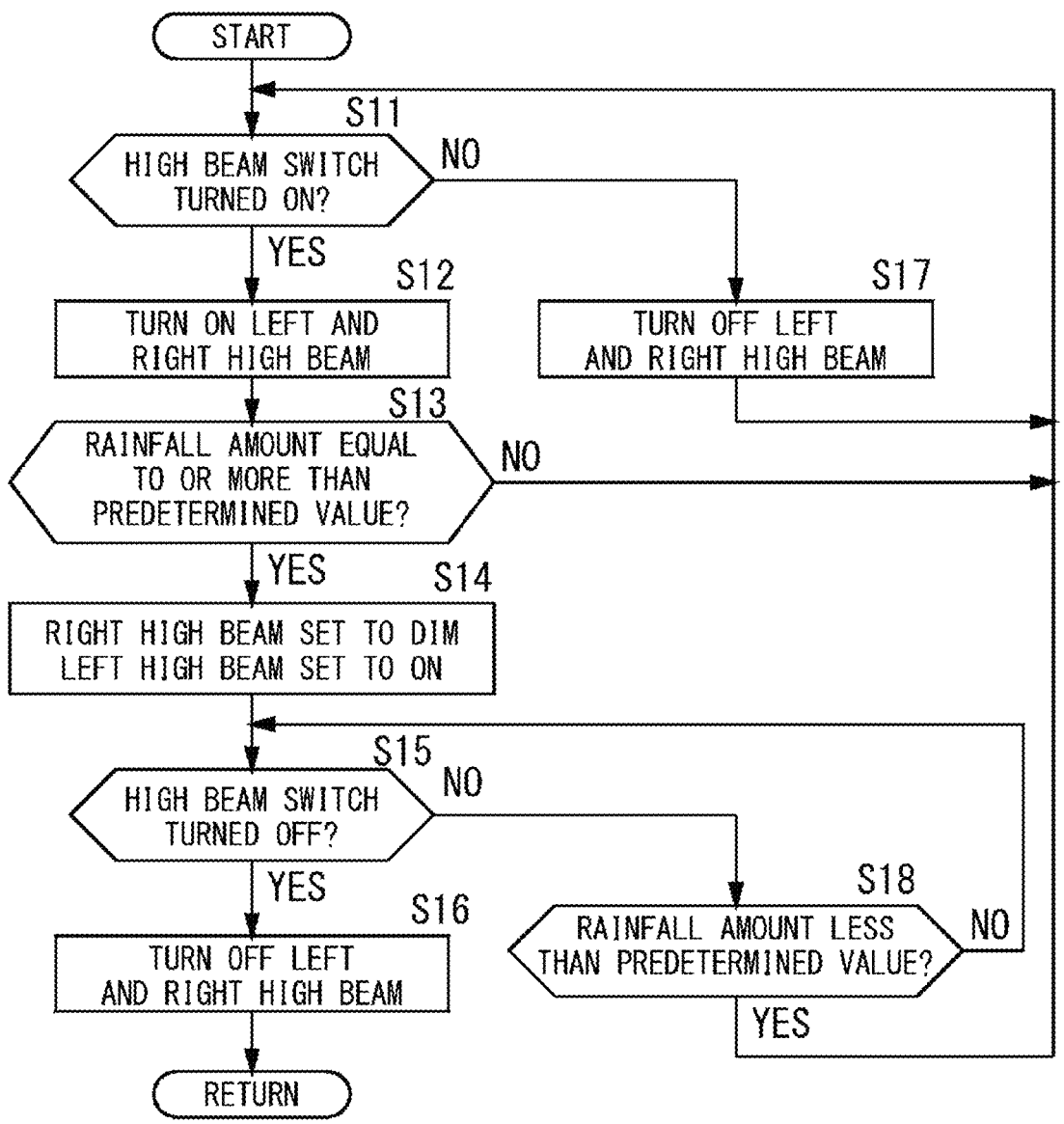
FIG. 2 is a flow chart showing the operation procedure of a controller of a headlight system according to one embodiment.

FIG. 2 is a flow chart showing the operation procedure of a controller of a headlight system according to one embodiment. Here, it is assumed that low beams are formed by the headlight units 5a and 5b in response to the operation of the lamp switch 3 and illuminated forward of the own vehicle, and hereinafter, operation of variably setting the irradiation mode of high beam according to the rainfall amount detected by the rainfall amount detection means 4 will be described. Note that the operation procedure of the flowchart described hereinafter is merely an example, and as long as there is no inconsistency in the operation, processing order of each step may be changed, or other process (not shown) may be added. The same applies to the operation procedure of the flow-charts shown in FIGS. 4 and 6, which will be described later.

The illumination state setting unit 11 of the controller 1 receives from the lamp switch 3 a signal which indicates its operation state, and based on the signal, when the switch for instructing the operation of high beam is turned on (step S11; YES), illumination state is set so that high beam is turned on by each of the left and right headlight units 5a and 5b (step S12). When the illumination state is set, a control signal is generated by the control signal generation unit 12 based thereon and output to each of the headlight units 5a and 5b, and high beams formed by each of the headlight units 5a and 5b are irradiated in front of the own vehicle.

Next, based on the signal output by the rainfall amount detection means 4, when the detected rainfall amount is equal to or more than a predetermined value (step S13; YES), the illumination state setting unit 11 sets illumination state such that high beam from the headlight unit 5a (right high beam) located on the same side as the driver's seat with respect to the center of the vehicle in the vehicle width direction is dimmed to make it relatively darker, and brightness of the high beam from the headlight unit 5b on the side opposite to the driver's seat (left high beam) is maintained (step S14). When the illumination state is set, a control signal is generated by the control signal generation unit 12 based thereon and output to each of the headlight units 5a and 5b, and high beams formed by each of the headlight units 5a and 5b are irradiated in front of the own vehicle. On the other hand, when the rainfall amount is not equal to nor more than the predetermined value (step S13; NO), the process returns to step S11.

Here, the predetermined value of amount of rainfall may be arbitrarily set based on experiments, etc., and for example, may be set to 20 mm/hour. As for the dimming of the right high beam, it is sufficient if the right high beam is relatively darker than the left high beam, and for example, luminous intensity of the right high beam may be 1/10 or less, or the luminous intensity may be substantially zero. It is preferable that, at least, the luminous intensity of the right high beam is half or less than that of the left high beam. This also applies to other embodiments to be described later.

Next, the illumination state setting unit 11 receives from the lamp switch 3 a signal which indicates its operation state, and based on the signal, when the switch for instructing the operation of high beam is turned off (step S15; YES), illumination state is set so that high beams of the left and right headlight units 5a and 5b are turned off (step S16). When the illumination state is set, a control signal is generated by the control signal generation unit 12 based thereon and output to the headlight units 5a and 5b, and high beams of the headlight units 5a and 5b are turned off. Then, the process returns to step S11.

Similarly, in step S11, when the switch for instructing the operation of high beam is turned off instead of being turned on (step S11; NO), illumination state is set by the illumination state setting unit 11, and high beams of the headlight units 5a and 5b are turned off (step S17). Then, the process returns to step S11.

On the other hand, in step S15, when the switch for instructing the operation of high beam is not turned off (step S15; NO), based on the signal output from the rainfall amount detection means 4, if the illumination state setting unit 11 determines that the rainfall amount is less than a predetermined value (step S18; YES), the process returns to step S11. In this case, if the switch for instructing the operation of high beams is turned on, the left and right high beams are turned on (step S12), and if the rainfall amount continues to be less than the predetermined value (step S13; NO), lighting state of each high beam is maintained.

Further, when the rainfall amount is not less than the predetermined value, that is, when the rainfall amount is equal to or more than the predetermined value (step 18; NO), the process returns to step S15. In this case, if the switch for instructing the operation of high beam is turned on, during the time that the rainfall amount is equal to or more than the predetermined value, the dimmed state of high beam 105a is maintained (step S14).

Figure 3A:
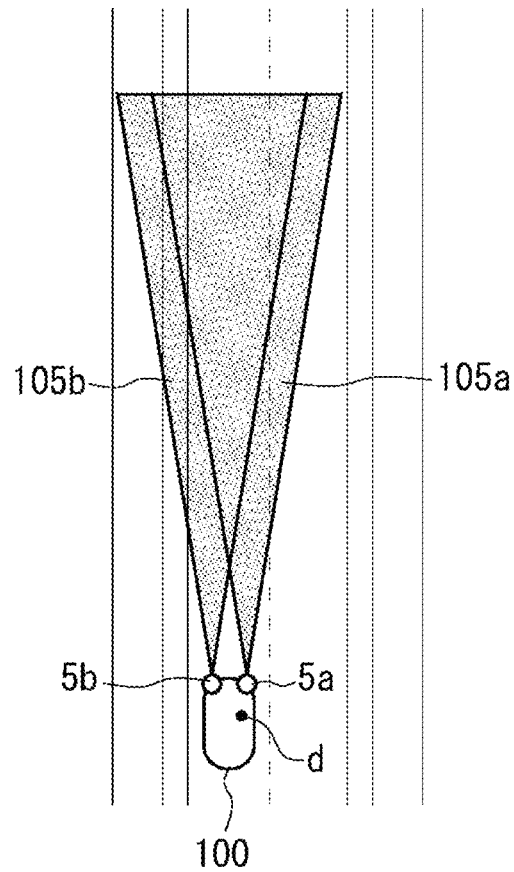
FIG. 3A is a diagram schematically showing the state of high beam irradiation in step S12.
Figure 3B:
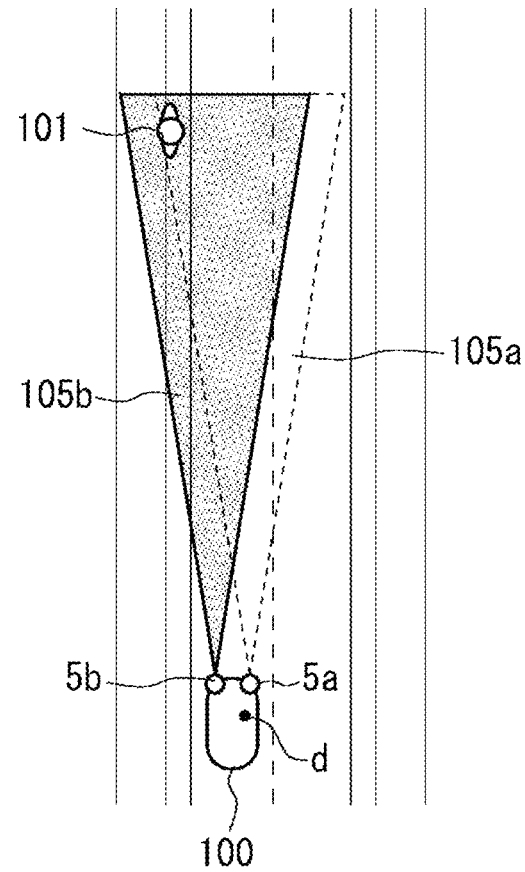
FIG. 3B is a diagram schematically showing the state of high beam irradiation in step S14.

FIG. 3A is a diagram schematically showing the state of high beam irradiation in step S12. In this specification, it is assumed that vehicles are required by law to drive on the left side and a driver's seat is located on the right side of a vehicle. FIG. 3A, and FIG. 3B to be described later, show plan views from the above of the vehicle 100 traveling in the left side lane of a two-lane road. In the figures, symbol d schematically indicates the position of the driver's seat. As shown in the figure, high beams 105a and 105b formed by the respective headlight units 5a and 5b are irradiated in front of the own vehicle 100 while partially overlapping each other.

FIG. 3B is a diagram schematically showing the state of high beam irradiation in step S14. In the illustrated example, high beam 105a formed by the headlight unit 5a which is on the same side as the driver's seat position d is substantially dimmed to a state close to being turned off. (It may be turned off completely.) On the other hand, high beam 105b formed by the headlight unit 5b on the opposite side is kept irradiated with sufficient luminous intensity. With such control, when there is a large amount of rainfall, since light irradiation in front of the own vehicle 100 is relatively reduced, visibility of the pedestrian 101 existing on the left side of the road (sidewalk, etc.) is improved.

Figure 4:
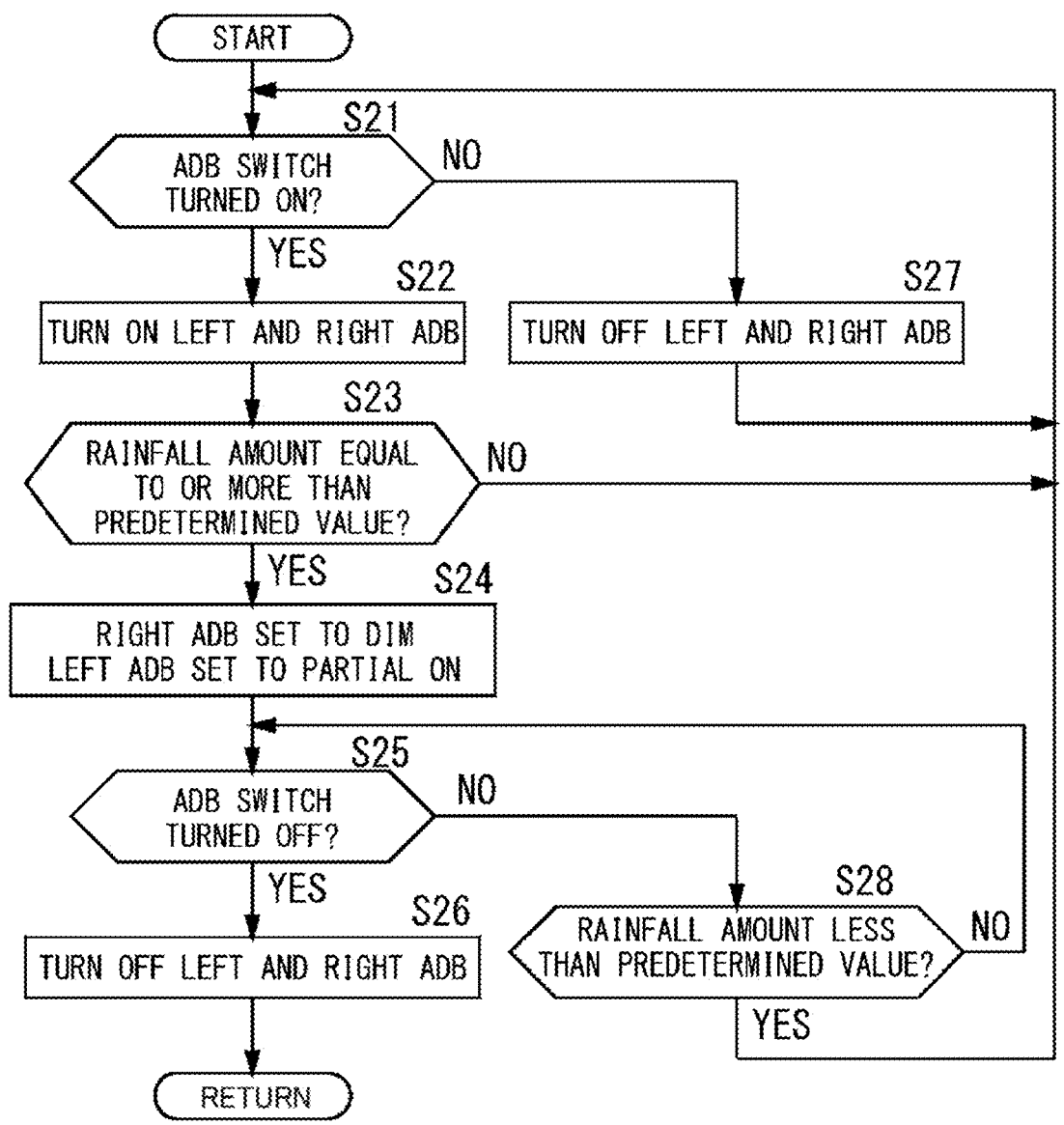
FIG. 4 is a flow chart showing an operation procedure of a controller of a headlight system according to another embodiment.

FIG. 4 is a flow chart showing an operation procedure of a controller of a headlight system according to another embodiment. Here, it is assumed that low beams are formed by the headlight units 5a and 5b in response to the operation of the lamp switch 3 and irradiated forward of the own vehicle, and operation of variably setting irradiation mode of the adaptive driving beam (ADB) according to the rainfall amount detected by the rainfall amount detection means 4 will be described.

The illumination state setting unit 11 receives from the lamp switch 3 a signal which indicates its operation state, and based on the signal, when the switch for instructing operation of the adaptive driving beam is turned on (step S21; YES), illumination state is set so that the adaptive driving beams by the left and right headlight units 5a and 5b are turned on (step S22). In this case, the illumination state setting unit 11 sets the illumination state so as to form adaptive driving beam which partially dims (or turns off) a partial area corresponding to the position of the forward vehicle detected by the imaging device 2. When the illumination state is set, a control signal is generated by the control signal generation unit 12 based thereon and output to each of the headlight units 5a and 5b, and the adaptive driving beams formed by each of the headlight units 5a and 5b are projected in front of the own vehicle.

Next, based on a signal output by the rainfall amount detection means 4, when the detected rainfall amount is equal to or more than a predetermined value (step S23; YES), the illumination state setting unit 11 sets illumination state so that the adaptive driving beam (right ADB) from the headlight unit 5a on the same side as the driver's seat is relatively dimmed, and the adaptive driving beam (left ADB) from the headlight unit 5b on the opposite side has a narrower irradiation range and is biased toward the shoulder of the road relatively far from the own vehicle (step S24). When the illumination state is set, a control signal is generated by the control signal generation unit 12 based thereon and output to each of the headlight units 5a and 5b, and the adaptive driving beams formed by each of the headlight units 5a and 5b are projected in front of the own vehicle. On the other hand, when the rainfall amount is not equal to nor more than the predetermined value (step S23; NO), the process returns to step S21.

Figure 5A:
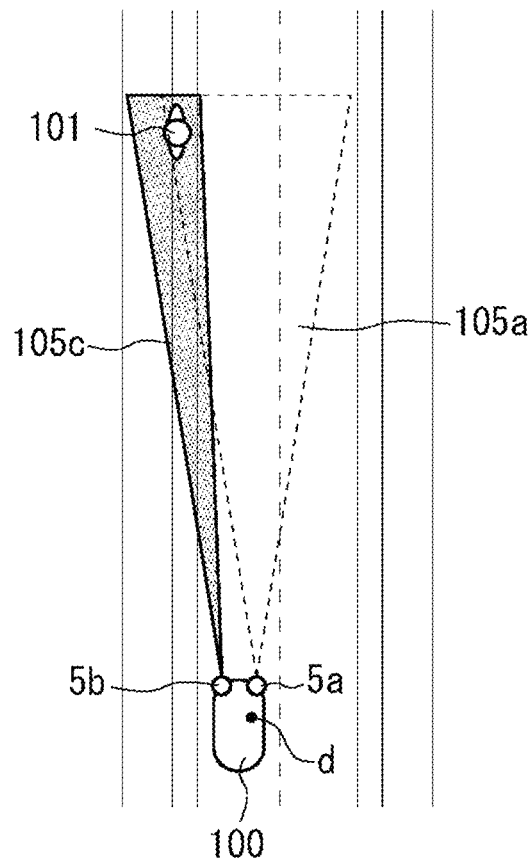
FIG. 5A is a diagram schematically showing the state of adaptive driving beam irradiation in step S24.
Figure 5B:
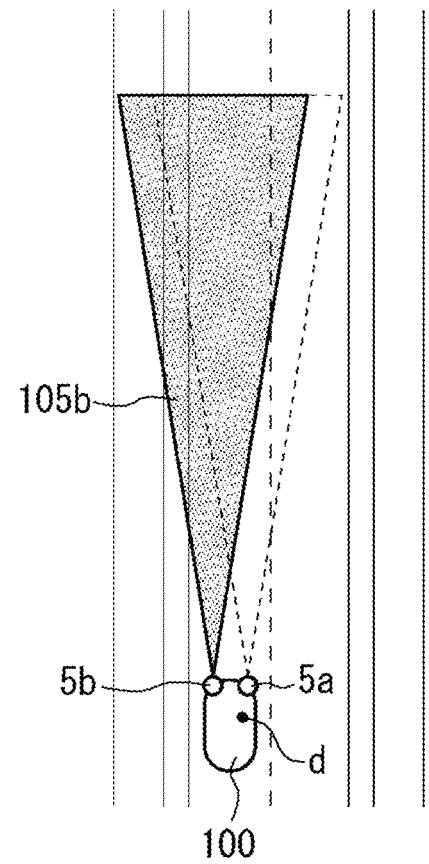
FIG. 5B is a diagram schematically showing the state of adaptive driving beam irradiation according to a comparative example.

FIG. 5A is a diagram schematically showing the state of adaptive driving beam irradiation in step S24. Further, FIG. 5B is a diagram schematically showing the state of adaptive driving beam irradiation according to a comparative example. In the illustrated examples, the adaptive driving beam 105a formed by the headlight unit 5a on the same side as the driver's seat position d is substantially dimmed to a state close to being turned off. (It may be turned off completely.) On the other hand, the adaptive driving beam 105c formed by the headlight unit 5b on the opposite side has a narrower irradiation range than the above-described adaptive driving beam 105b, and is biased toward the side of the road opposite to the driver's seat. With such control, when the rainfall amount is large, since light irradiation in front of the own vehicle 100 is reduced, visibility of the pedestrian 101 on the left sidewalk, etc. is further improved.

Next, the illumination state setting unit 11 receives from the lamp switch 3 a signal which indicates its operation state, and based on the signal, when the switch for instructing operation of the adaptive driving beam is turned off (step S25; YES), illumination state is set so that high beams of the left and right headlight units 5a and 5b are turned off (step S26). When the illumination state is set, a control signal is generated by the control signal generation unit 12 based thereon and output to each of the headlight units 5a and 5b, and the adaptive driving beams from each of the headlight units 5a and 5b are turned off. Then, the process returns to step S21.

Similarly, in step S21, when the switch for instructing the operation of high beam is turned off instead of being turned on (step S21; NO), illumination state is set by the illumination state setting unit 11, and the adaptive driving beams from the headlight units 5a and 5b are turned off (step S27). Then, the process returns to step S21.

On the other hand, when the switch for instructing the operation of high beam is not turned off (step S25; NO), based on the signal output from the rainfall amount detection means 4, if the illumination state setting unit 11 determines that the rainfall amount is less than the predetermined value (step S28; YES), the process returns to step S21. In this case, if the switch for instructing the operation of adaptive driving beams is turned on, the left and right adaptive driving beams are turned on (step S22), and if the rainfall amount continues to be less than the predetermined value (step S23; NO), lighting state of each adaptive driving beam is maintained.

Further, when the rainfall amount is not less than the predetermined value, that is, when the rainfall amount is equal to or more than the predetermined value (step 28; NO), the process returns to step S25. In this case, if the switch for instructing the operation of adaptive driving beam is turned on, during the time that the rainfall amount is equal to or more than the predetermined value, the dimmed state of the adaptive driving beam 105a is maintained (step S24).

Figure 6:
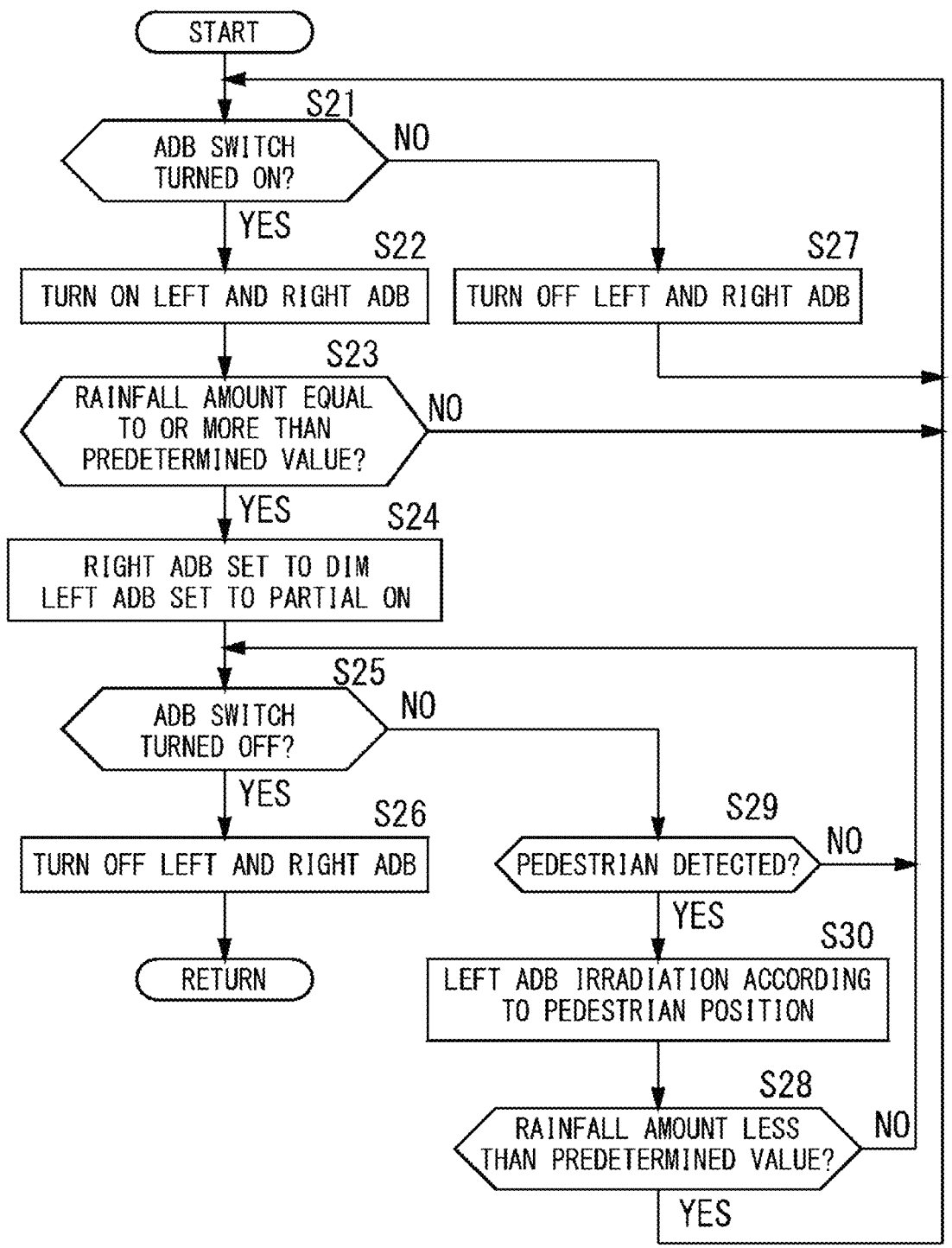
FIG. 6 is a flow chart showing the operation procedure of a controller of a headlight system according to another embodiment.

FIG. 6 is a flow chart showing the operation procedure of a controller of a headlight system according to another embodiment. This embodiment has much in common with the embodiment shown in FIG. 4, and differs only in that a process according to a pedestrian detection result is added between step S25 and step S28. Therefore, in the following, the added process will mainly be described, and the description of the other process will be omitted.

When the switch for instructing the operation of adaptive driving beam is not turned off (step S25; NO), based on the data output from the imaging device 2, when a pedestrian is detected (step S29; YES), the illumination state setting unit 11 sets illumination state so that a narrow-angle adaptive driving beam is formed according to the position of the pedestrian. When the illumination state is set, a control signal is generated by the control signal generation unit 12 based thereon and output to each of the headlight units 5a and 5b, and the adaptive driving beams formed by each of the headlight units 5a and 5b are projected in front of the own vehicle (step S30). Then, the process proceeds to step S28. On the other hand, when no pedestrian is detected (step S29; NO), the process returns to step S25.

After light irradiation in accordance with the pedestrian is carried out, based on the signal output from the rainfall amount detection means 4, if the illumination state setting unit 11 determines that the rainfall amount is less than the predetermined value (step S28; YES), the process returns to step S21. Further, when it is determined that the rainfall amount is not less than the predetermined value, that is, when the rainfall amount is equal to or more than the predetermined value (step 28; NO), the process returns to step S25.

Figure 7A:
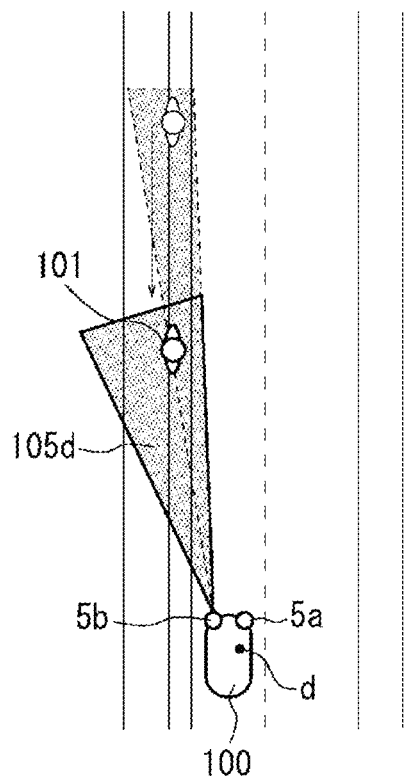
FIGS. 7A and 7B are diagrams schematically showing the state of adaptive driving beam irradiation in step S30.
Figure 7B:
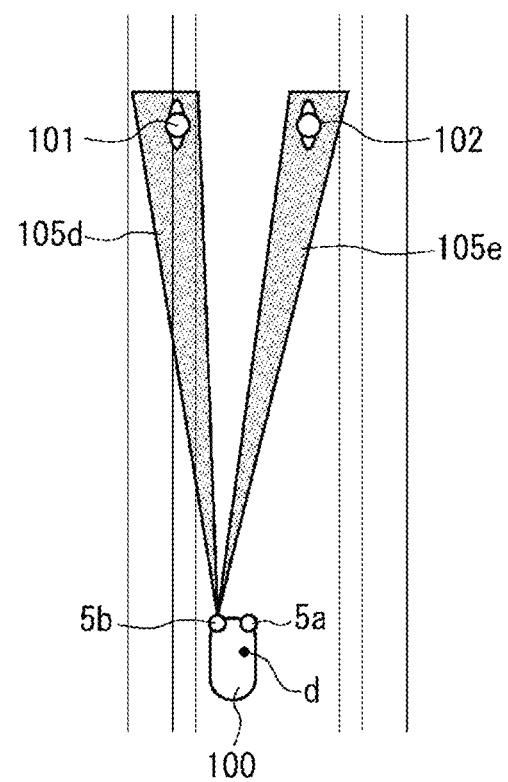

FIGS. 7A and 7B are diagrams schematically showing the state of adaptive driving beam irradiation in step S30. In the example of each figure, the adaptive driving beam 105a formed by the headlight unit 5a on the same side as the driver's seat position d is substantially dimmed to a state close to being turned off. (It may be turned off completely.) On the other hand, as illustrated in FIG. 7A, the adaptive driving beam 105d formed by the headlight unit 5b on the opposite side is irradiated at a narrow angle according to the position of the pedestrian 101 existing on the sidewalk on the left side of the own vehicle 100, and the irradiation direction is variably set according to the movement of the position of the pedestrian 101. Further, as illustrated in FIG. 7B, when there are two pedestrians 101 and 102 present, adaptive driving beams 105d and 105e which corresponds to the two pedestrians are formed by the headlight unit 5b, and are irradiated at narrow angles according to the respective positions of the pedestrians 101 and 102. With such control, even when there is a large amount of rainfall, visibility of the pedestrians 101 and 102 existing in front of the own vehicle 100 is further improved.

According to each embodiment described above, it is possible to improve pedestrian visibility.

Here, it should be noted that the present disclosure is not limited to the content of the above-described embodiments, and can be implemented in various modifications within the scope of the gist of the present disclosure. For example, in this specification, a headlight may be any lamp that irradiates the front (further to the side and the periphery) of the own vehicle, and for example, the art according to the present disclosure may be applied to various lamps such as a cornering lamp, a fog lamp, and a lamp whose direction is variably set according to the steering wheel angle of the own vehicle.

Further, when performing control according to the embodiments shown in FIGS. 2 and 4, the headlight system need not include the imaging device 2. Further, when performing control according to the embodiment shown in FIG. 2, each headlight unit 5a, 5b of the headlight system does not necessarily need a function of forming an adaptive driving beam.

Figure 8A:
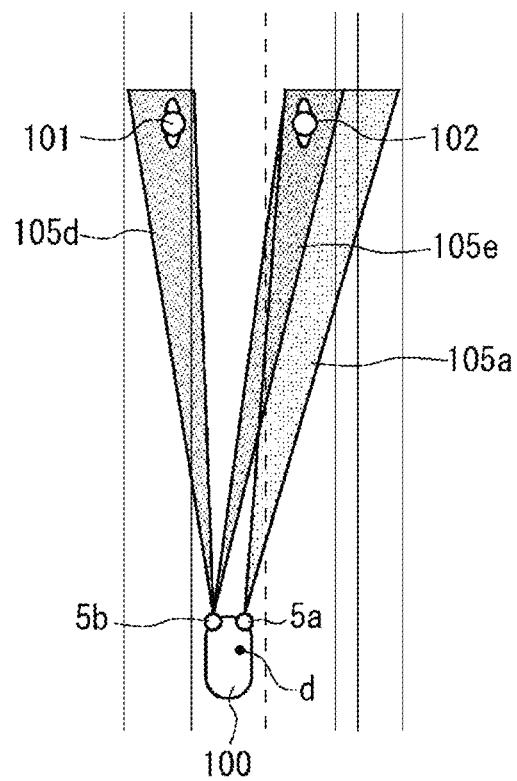
FIGS. 8A and 8B are diagrams schematically showing the state of adaptive driving beam irradiation according to a modified embodiment.
Figure 8B:
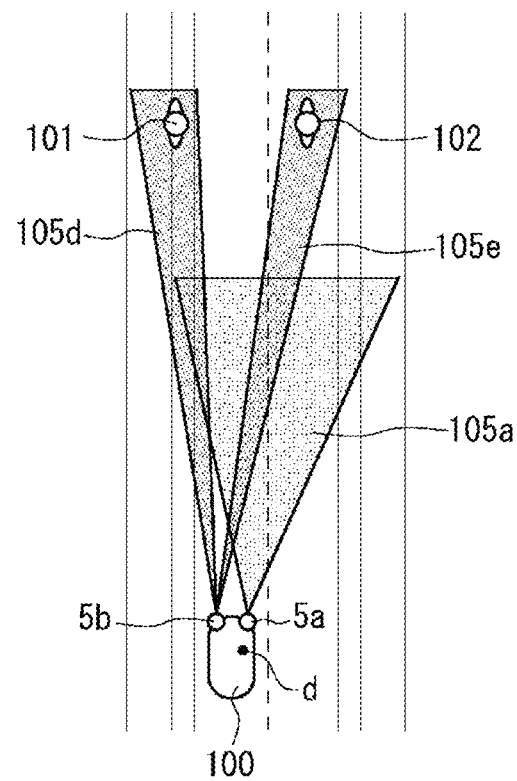

Further, in each of the above-described embodiments, when the rainfall amount is equal to or more than the predetermined value, the irradiation light emitted by the headlight unit 5a is dimmed toward the whole area in front, however, the irradiation light may only be emitted with dimmed light toward a specific area within the whole area while the remaining area is irradiated with sufficient luminous intensity. FIGS. 8A and 8B are diagrams schematically showing the state of adaptive driving beam irradiation according to a modified embodiment. In the modified embodiment shown in FIG. 8A, the irradiation light 105a from the headlight unit 5a is emitted with a smaller irradiation range so as to be biased toward the side of the road on the same side as the position d of the driver's seat of the own vehicle 100. Further, in the modified embodiment shown in FIG. 8B, the irradiation light 105a from the headlight unit 5a is irradiated with a smaller irradiation range so as to be biased toward a relatively closer side in the traveling direction of the own vehicle 100. By such control of emitting the irradiation light 105a together with the irradiation light 105d and 105e from the headlight unit 5b, visibility of pedestrian 101 and pedestrian 102 can further be improved.

Here, in the above embodiments, cases where a vehicle drives on the left side of a road is exemplified. However, unlike these embodiments, when the vehicle drives on the right side, needless to say that control is performed by reversing left and right in the above-described embodiments.

DESCRIPTION OF REFERENCE NUMERALS

1: Controller
2: Imaging device
3: Lamp switch
4: Rainfall amount detection means
5a, 5b: Headlight unit
11: Illumination state setting unit 12: Control signal generation unit
21: Camera
22: Image processing unit
100: Own vehicle
101, 102: Pedestrian
105a, 105b, 105c, 105d, 105e: Irradiation light (high beam or adaptive driving beam)

The invention claimed is:

1. A headlight controller connectable to a first headlight and a second headlight spaced apart in a vehicle width direction at the front of the vehicle, the headlight controller comprising:
   a rainfall amount detection means installed in the vehicle; and
   a controller installed in the vehicle, wherein the controller is connected to the rainfall amount detection means, and the controller carries out control such that when rainfall amount detected by the rainfall amount detection means is equal to or more than a predetermined value, irradiation light from the first headlight becomes relatively darker than irradiation light from the second headlight,
   wherein the first headlight and the second headlight are configured to form high beam light or an adaptive driving beam,
   wherein the first headlight is arranged on the same side as a driver's seat of the vehicle with respect to a predetermined position of the vehicle in the vehicle width direction, and
   wherein the second headlight is arranged on the side opposite to the driver's seat of the vehicle with respect to the predetermined position of the vehicle in the vehicle width direction.

2. The headlight controller according to claim 1, wherein, compared to the irradiation light of the second headlight when the rainfall amount is less than the predetermined value, when the rainfall amount is equal to or more than a predetermined value, the controller controls the irradiation range of the irradiation light of the second headlight to be relatively small.

3. The headlight controller according to claim 2, wherein, compared to the irradiation light of the second headlight when the rainfall amount is less than the predetermined value, when the rainfall amount is equal to or more than a predetermined value, the controller controls the irradiation range of the irradiation light of the second headlight to be smaller and biased toward the side opposite to the driver's seat of the vehicle.

4. The headlight controller according to claim 1, wherein, compared to the irradiation light of the first headlight when the rainfall amount is less than the predetermined value, when the rainfall amount is equal to or more than a predetermined value, the controller controls the irradiation range of the irradiation light of the first headlight to be smaller and biased toward the same side as the driver's seat of the vehicle.

5. The headlight controller according to claim 1, wherein, compared to the irradiation light of the first headlight when the rainfall amount is less than the predetermined value, when the rainfall amount is equal to or more than a predetermined value, the controller controls the irradiation range of the irradiation light of the first headlight to be smaller and biased toward a relatively closer side in the traveling direction of the vehicle.

6. The headlight controller according to claim 1 further comprising a pedestrian detector installed in the vehicle and connected to the controller,
   wherein, when a pedestrian is detected around the vehicle by the pedestrian detector, the controller controls such that the irradiation light of the second headlight is irradiated toward a range set according to the position of the pedestrian.

7. A headlight system including the controller according to claim 1, and a first headlight and a second headlight spaced apart in a vehicle width direction at the front of the vehicle.

8. A headlight control method for controlling lighting state of a first headlight and a second headlight by a controller, the first headlight and the second headlight spaced apart in a vehicle width direction at the front of the vehicle,
   wherein the first headlight and the second headlight are configured to form high beam light or an adaptive driving beam,
   wherein the first headlight is arranged on the same side as a driver's seat of the vehicle with respect to a predetermined position of the vehicle in the vehicle width direction,
   wherein the second headlight is arranged on the side opposite to the driver's seat of the vehicle with respect to the predetermined position of the vehicle in the vehicle width direction, and
   wherein, when rainfall amount detected by a rainfall amount detection means is equal to or more than a predetermined value, the controller carries out control such that irradiation light from the first headlight becomes relatively darker than irradiation light from the second headlight.

* * * * *